United States Patent [19]

Gerding

[11] Patent Number: 4,632,442
[45] Date of Patent: Dec. 30, 1986

[54] CONDUIT CARRYING DEVICE

[76] Inventor: Thomas W. Gerding, 5805 Hawkins-Fuchs Rd., St. Louis, Mo. 63129

[21] Appl. No.: 780,802

[22] Filed: Sep. 27, 1985

[51] Int. Cl.$^4$ .............................................. B65G 7/12
[52] U.S. Cl. .................................... 294/16; 294/119.1
[58] Field of Search ...................... 294/1.1, 11, 15–17, 294/62, 66.1, 67.33, 82.35, 86.4, 102.1, 113, 114, 117, 119.1, 137, 167, 169; 248/58, 62, 65, 74.1

[56] References Cited

U.S. PATENT DOCUMENTS

| | | |
|---|---|---|
| 877,012 | 1/1908 | Sullivan ................................ 294/16 |
| 996,259 | 6/1911 | Kern .................................. 294/113 X |
| 1,729,330 | 9/1929 | Dart ................................... 294/119.1 |
| 2,078,848 | 4/1937 | Greger ................................ 294/16 X |
| 2,298,145 | 10/1942 | Merrylees ......................... 294/119.1 |
| 2,461,394 | 2/1949 | Plante ................................ 294/102.1 |

FOREIGN PATENT DOCUMENTS

809353 7/1951 Fed. Rep. of Germany ... 294/82.35

Primary Examiner—Johnny D. Cherry
Attorney, Agent, or Firm—Haverstock, Garrett & Roberts

[57] ABSTRACT

A conduit carrying device for use by construction workers and the like for manually grasping and carrying an elongated element such as pipes and other conduit members comprising a substantially U-shaped support frame member having a pair of spaced apart leg members defining a space therebetween, a closure member slidably mounted within guide channels at the respective free end of each leg member for controlling access to the spaced defined therebetween, the closure members being slidably positionable between an open position allowing access to the space between the leg members for admitting a conduit member therebetween and a closed position restricting access thereto for holding and retaining a conduit member therewithin, the closure members being angularly oriented with respect to the longitudinal axis of the leg members such that when the leg members are in a substantially vertical position gravity will urge each closure member towards its closed position, and a pair of handle assemblies pivotally attached to the support frame member and projecting laterally therefrom, each handle assembly being pivotally movable between a folded storage position located adjacent and substantially parallel to one of the respective leg members and a horizontally extended carrying position for gripping by a user thereof to grasp and carry the device with a conduit member held therein.

22 Claims, 5 Drawing Figures

CONDUIT CARRYING DEVICE

BACKGROUND OF THE INVENTION

1. Field of the Invention

The present invention relates to a device for grasping and carrying pipes or other conduit members and more particularly, to a conduit carrying device including a support frame member having a cross portion and spaced opposed leg members extending therefrom defining an opening or space therebetween, a slidably mounted closure member positioned near the free end of each leg member for controlling access to the opening or space formed between the opposed leg members, the closure members being movable between a closed position restricting access to said space and an open position allowing admittance of a conduit member therebetween, the closure members engaging and supporting a conduit member positioned within said space when said members are in their closed position, and pivotal handle means for effecting movement thereof from one location to another.

2. Description of the Related Art

It is frequently necessary to lift and move elongated cylindrical elements such as metal pipes and/or other conduit members for one location to a work or installation location wherein such elements are too cumbersome or heavy to be conveniently grasped and lifted by hand by a single worker. A number of devices to aid in the moving or lifting of such elements are known and generally include a U-shaped frame movably supporting a pair of laterally swingable jaws adapted to clamp or support such elements. Examples of such known devices are disclosed in the U.S. Pat. Nos. 2,655,401 and 4,367,893, however, such devices usually include complicated, cumbersome and/or expensive means for causing the jaws associated with such devices to move to a clamping or supporting position. Other more simple devices are known for the purpose at hand such as the belt or tong type gripping devices disclosed in the U.S. Pat. Nos. 2,274,985 and 4,458,933, however, these devices do not lend themselves well to installation on, or prolonged carrying of elongated conduits and the like by multiple workers. In addition, many of the known devices include mechanisms which are inconvenient, awkward and difficult tp handle and operate, and often require considerable manipulation on the part of the user in order to adequately support and lock the conduit or other member in its supported position within the assembly.

Still further, a conduit support device for supporting a conduit member in a fixed position, such as within a building, is disclosed in Applicant's U.S. Pat. No. 4,436,266 wherein a U-shaped support frame is provided with a closure member pivotally mounted adjacent the free end of one or both of the leg members associated therewith. The closure member is pivotally movable between an open position to admit a conduit into the space defined by and between the leg members and a closed position supporting a conduit member in such space. The suspension devices disclosed in U.S. Pat. No. 4,436,266 are intended for use in holding and supporting a pipe or other conduit member at a predetermined distance below an overhead structure and such devices include no means whatsoever for grasping, lifting and carrying a conduit member by hand from one location to another nor do they facilitate as convenient a means for release of a conduit member being supported therewithin.

SUMMARY OF THE INVENTION

The present invention overcomes the disadvantages and shortcomings of the prior art and provides a device for use in embracing, grasping, lifting, carrying and releasing conduit members which might otherwise be difficult and awkward to handle. In building construction and other similar work, it is frequently necessary to move pipes and other types of conduit members which are too cumbersome or heavy to be lifted and carried manually by a single person. Mechanized lifting and carrying by a hoist or crane might not be possible because of space limitations and other considerations. For such instances, the present invention provides a device to grasp, support and carry elongated cylindrical elements, such as pipes or conduits, by several workers simultaneously, which device is convenient to load and unload. The present device includes an inverted substantially U-shaped support frame member for placement over a conduit member to be moved, a novel closure member slidably mounted on at least one leg member of the support frame for slidable movement beneath the conduit for the support thereof, and pivotable handle means mounted on opposite lateral sides of the support frame member for facilitating grasping and lifting of the entire assembly. Normally, one such device for lifting by one or two workers is positioned on each longitudinal end of a heavy pipe or conduit to be moved, but devices positioned intermediate the length thereof could be used if so required due to the weight of the conduit member to be carried. The U-shaped frame member includes first and second spaced opposed leg members joined together by a cross portion extending between the upper portions thereof. At least one of the leg members has means adjacent the lower end thereof defining a slide or guide channel in which a closure member is slidably positioned. The closure member is slidable between an outboard or open position wherein the closure member is withdrawn from the space between the leg members, and an inboard or closed position wherein the closure member is moved toward the opposite leg member to at least partially restrict egress from said space. The guide channel in which the closure member moves is angularly oriented with respect to the leg member on which it is mounted such that when the leg members are in a vertical position such as to straddle a horizontal pipe, the closure member is urged towards its closed position by gravity. A second similarly shaped closure member may also be positioned on the second leg member adjacent the lower end thereof.

The present device further includes handle means projecting laterally from the upper portion of the U-shaped frame member for gripping the device by one or more workers. The handle means includes at least one handle member pivotally attached to the support frame member adjacent the cross portion thereof for foldably moving the handle member between a horizontally extended carrying position and a folded or storage position located adjacent and substantially parallel to its respective leg member. The preferred embodiment includes first and second oppositely projecting handle members pivotally mounted on opposite lateral sides of the cross portion. The handle members project so that they may be easily grasped for lifting of the present device with a pipe or other conduit held therein by a pair of workers on opposte sides thereof, and said handle members are easily foldable to positions adjacent the respective leg members so that the device may be conveniently stored such as in a tool box or the like.

To lift and carry a pipe or other conduit member in accordance with the present invention, the vertically oriented, inverted U-shaped frame assembly is lowered over a horizontally positioned conduit member with the leg members thereof extending downwardly on either lateral side thereof. The inwardly facing end of each slidable closure member contacts the upper peripheral sides of the conduit and are moved thereby upwardly and outwardly toward their respective open positions to admit the conduit into the space by and between the leg members. The exertion of an inward and upward force on the closure members, such as by pushing the conduit member thereagainst, slidably moves the closure members towards their open positions and allows the user thereof to easily insert the conduit member within the device. Once the conduit member is positioned therewithin and moved far enough to clear the free ends of the closure members, the closure members, urged by gravity, will be moved to their closed positions so as to lie beneath and engage the lower periphery of the conduit member to support it thereon and prevent it from falling out of the device. Once positioned within the device, the conduit member is confined and supported by the frame and closure members. The handle members are then rotated to their extended carrying positions and are grasped by one or more persons to facilitate lifting and carrying of the conduit member to the desired location. The upper portion of the support frame member may also include an aperture near the center thereof through which an attaching or gripping means, such as a hook, may be inserted so that a power hoist may be used alternately to lift the device and a conduit member being held thereby.

Removal of a conduit member from within the present device is easily accomplished by slidably moving each closure member to its outboard open position. To facilitate such relocation of the closure members to their open positions, each closure member may be provided with a ring member or the like for grasping and pulling in an outboard direction. The present conduit carrying device is considered to be compact, portable, and easy to operate and it facilitates cooperation of as many workers as are necessary to lift, carry, and position cumbersome, heavy or multiple pipes and conduits not accessible to a power hoist. As many of the present devices and as many workers as are necessary may be employed to manually lift the conduit member being repositioned. It is also recognized that the present device may be dimensioned and constructed so as to conform to and accommodate conduit members of varying sizes.

It is therefore a principal object of the present invention to provide a conduit carrying device which enables multiple workers to conveniently lift and carry conduits without resort to mechanized means.

Another object is to provide a conduit carrying device which may be easily folded for storage, such as in a tool box.

Another object is to provide a conduit carrying device of simple construction for grasping and carrying one or more conduits of various sizes and weights.

Another object is to provide a conduit carrying device which facilitates the rapid mounting of a conduit member therewithin.

Another object is to provide a conduit carrying device for safely supporting a conduit member from below without danger of the conduit member slipping from the grasp of the device.

Another object is to teach the construction and operation of a conduit carrying device which can be easily accessed by the users thereof for easy removal of a conduit member therefrom.

Another object is to provide a conduit carrying device that is structurally and operationally relatively simple, durable, easy to use and requires a minimum of manipulation to position and load a conduit member therewithin for movement from one location to another.

BRIEF DESCRIPTION OF THE DRAWINGS

These and other objects and advantages of the present invention will become apparent to those skilled in the art after considering the following detailed specification of a preferred embodiment of the present invention in conjunction with the accompanying drawings, wherein.

DETAILED DESCRIPTION OF THE PREFERRED EMBODIMENT

Figures 1, 5:
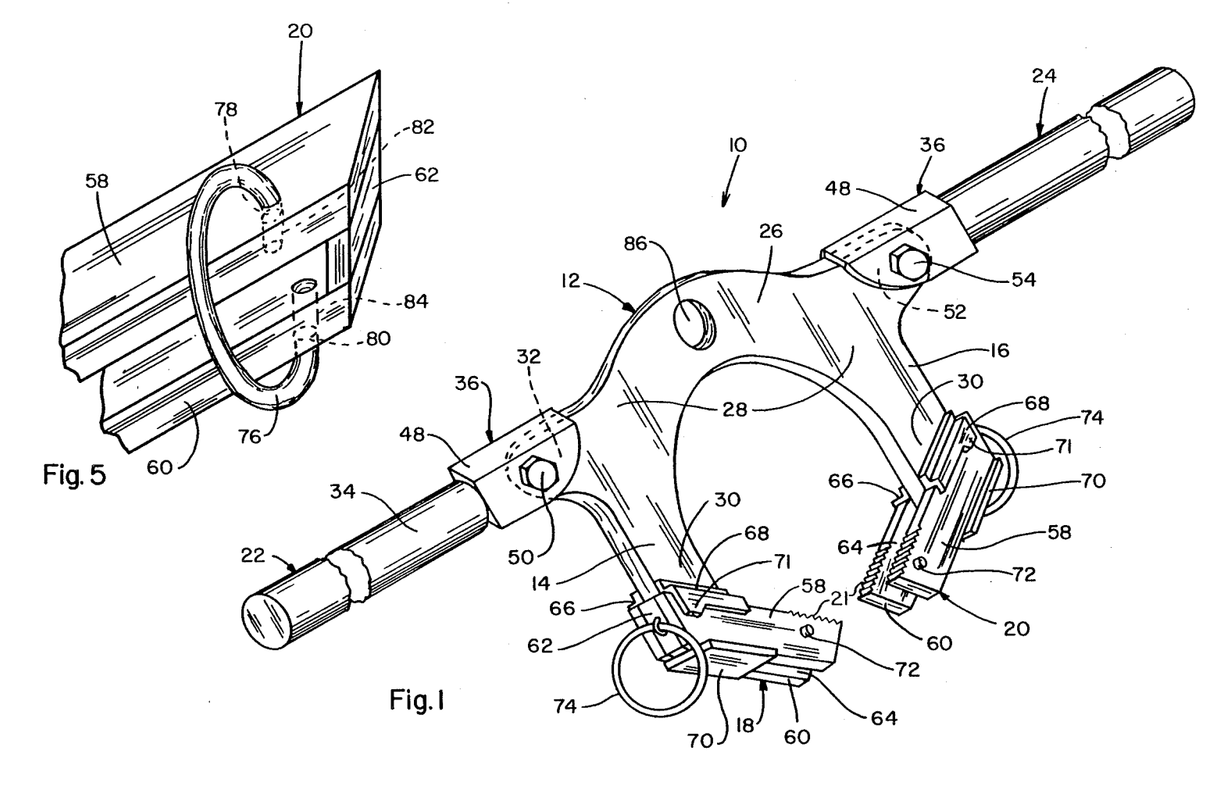
FIG. 1 is a perspective view of a conduit carrying device constructed according to the teachings of the present invention.
FIG. 5 is a partial perspective view of one of the closure members utilized in the present device showing another mounting arrangement for attaching the ring member thereto.
Figure 2:
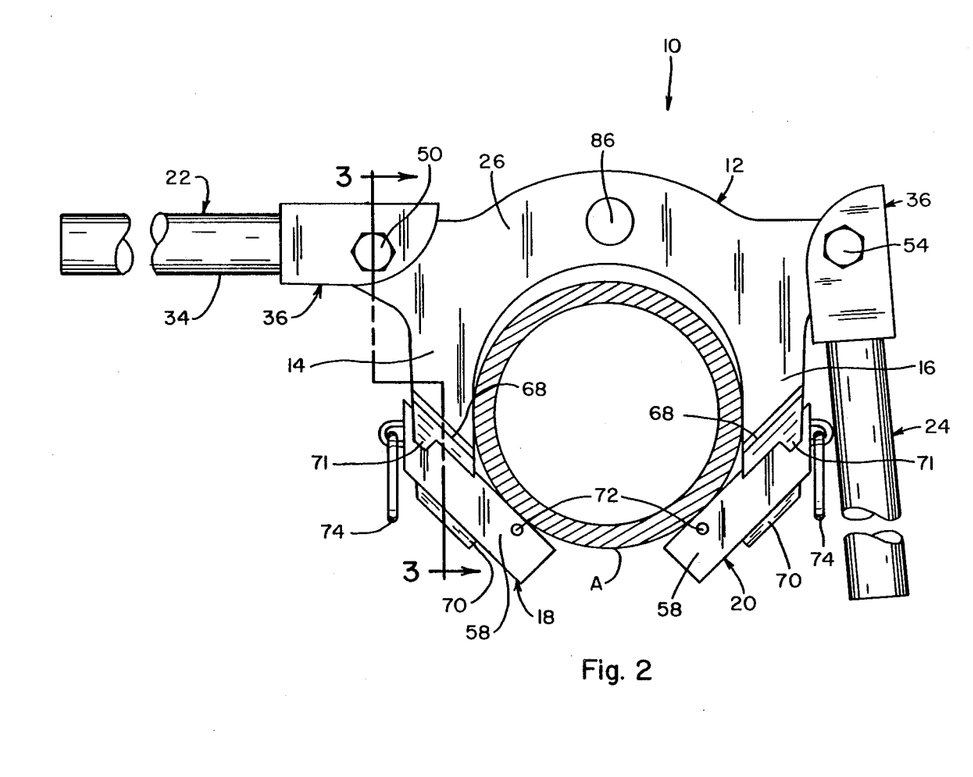
FIG. 2 is a front elevation view of the device of FIG. 1 showing a conduit member embraced thereby.
Figure 4:
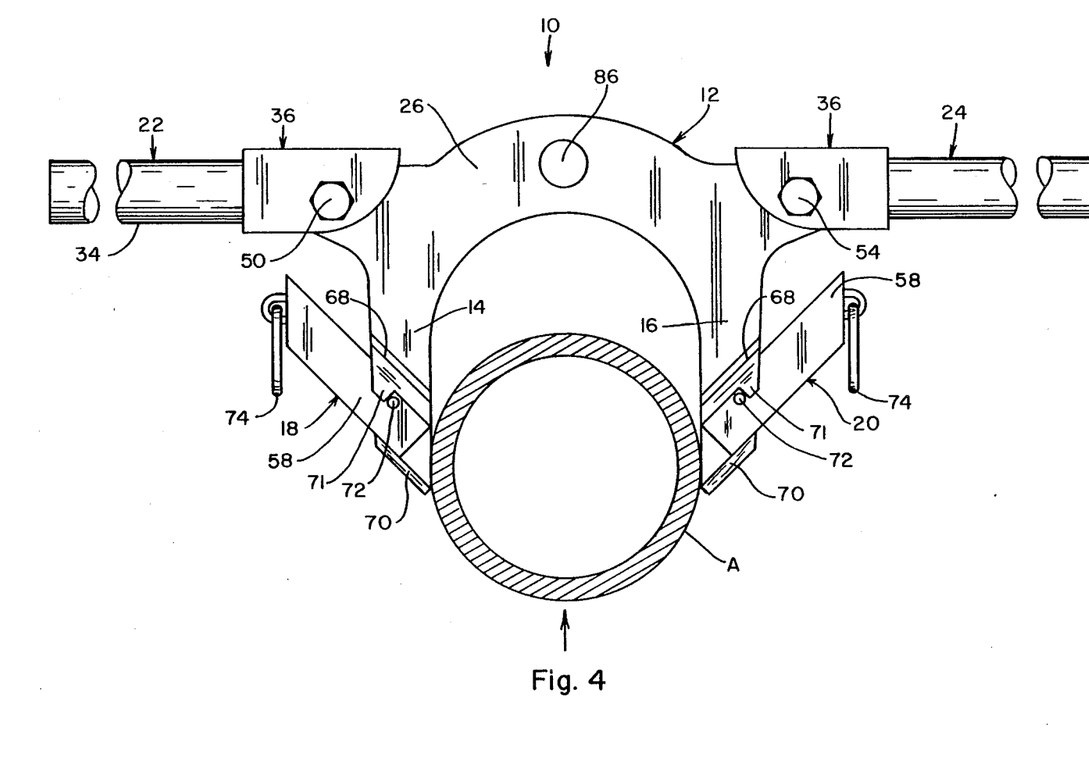
FIG. 4 is a front elevation view of the device of FIG. 1 showing a conduit member in an intermediate stage of being inserted or released therefrom.

Referring to the drawings more particularly by reference numbers wherein like numerals refer to like parts, FIG. 1 illustrates a preferred embodiment of the present invention and identifies a conduit carrying device 10 constructed according to the teachings of the present invention. The conduit carrying device 10 includes an inverted substantially U-shaped support frame member 12 having a top or cross portion 26 preferably integrally formed therewith and first and second laterally spaced leg members 14 and 16 extending respectively therefrom as shown in FIGS. 1, 2 and 4. The support frame member 12 is preferably integrally cast from steel or some other durable material. Slidably mounted on the lower free end portion of the leg members 14 and 16 are first and second closure members 18 and 20 respectively. The closure members 18 and 20 are slidably movable as will be hereinafter explained between a closed position (FIG. 2) extending toward the opposite leg member to restrict or at least partially restrict access to the space between the leg members 14 and 16 and an open position whereby the closure members are withdrawn from the space between the leg members in an outward direction away from the opposite leg member to open said space for admitting a conduit member therebetween as shown in FIG. 4. The closure members 18 and 20 are similarly shaped and are dimensioned along with the support frame member 12 such that a pipe or other conduit may be inserted between the pair of closure members and positioned so as to lie within the enclosed space formed by the frame member 12 and the closure members 18 and 20. Pivotally mounted on the upper end portion of the frame member 12 are first and second elongated handle assemblies 22 and 24 which project laterally on opposite sides thereof. A device with a single closure member (not shown) may also alternately be employed.

Figure 3:
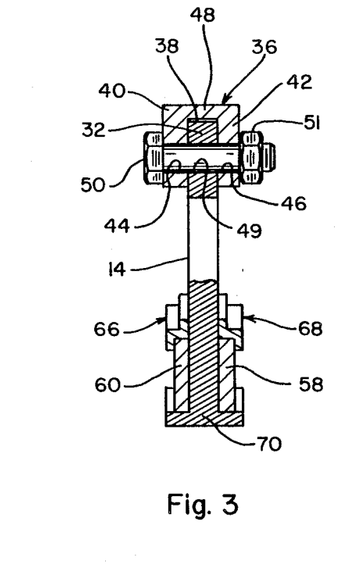
FIG. 3 is a cross sectional view of the device taken along lines 3—3 of FIG. 2.

The leg members 14 and 16 each respectively include upper and lower portions 28 and 30, the upper portion 28 being integrally joined to the cross portion 26 as shown in FIG. 1. A laterally extending ear portion 32 is provided adjacent the upper end portion 28 of the leg member 14 for pivotally mounting thereto a first elongated handle assembly 22. The ear portion 32 is likewise preferably integrally formed with the entire frame member 12. The handle assembly 22 comprises a laterally projecting handle element 34 having a U-shaped bracket 36 fixedly connected to one end portion thereof for embracing and engaging the ear portion 32. As shown more clearly in FIG. 3, the bracket 36 includes a connected pair of opposed flange members 40 and 42 defining a space 38 therebetween. The flange members 40 and 42 are interconnected in spaced apart relationship by means of the connecting portion or flange 48 (FIG. 3) positioned extending between the flanges 40 and 42 on the upper side thereof. The flanges 40 and 42 are sufficiently spaced such that the space 38 defined therebetween is sufficiently large to receive and embrace the ear portion 32. Each of the flange members 40 and 42 also includes a bore 44 and 46 extending respectively therethrough adaptable for receiving a pivot pin 50. The bores 44 and 46 register with the bore 49 extending through the ear portion 32 when the ear portion 32 is properly positioned within the space 38. Once positioned in proper alignment with each other, the pivot pin 50 is inserted through the bores 44, 46 and 49 and can be retained therein by any suitable means. For example, as shown in FIG. 3, one end of the pivot pin 50 may be threaded and the pin 50 may be secured in the bores 44, 46 and 49 by a threaded nut 51 mounted thereon.

A second elongated handle assembly 24 substantially identical to the construction of the handle assembly 22 is pivotally mounted to a similarly shaped ear portion 52 extending laterally from adjacent the upper portion 28 of the leg member 16 by use of a similar pivot pin 54. Once pivotally connected to their respective portions 32 and 52, the handle assemblies 22 and 24 are each rotatably movable about their respective pivot pins 50 and 54 between a folded or storage position located adjacent and substantially parallel to one of the leg members such as the handle assembly 24 shown in FIG. 2 wherein the handle 24 is positioned substantially parallel to the leg member 16, and a horizontally extended carrying position such as the handle assembly 22 shown in FIG. 2 wherein the handle 22 is positioned substantially normal to the longitudinal axis of the leg member 14. With both of the handle assemblies extended to their respective carrying positions, the handles 22 and 24 assume a substantially in-line configuration as shown in FIG. 4 so that each may be grasped for a pipe carrying operation. It is also important to note that the connecting flanges 48 associated with the brackets 36 are located adjacent the upper surface of the ear portions 32 and 52 so as to engage these portions when the handle assemblies 22 and 24 are in their extended in-line carrying position, the flanges 48 acting as stop means to restrict movement of the handle members beyond their in-line carrying positions. In this regard, the size and strength of material of the ear portions 32 and 52, the brackets 36 and the connecting flanges 48 is important because the weight of the pipe or conduit carried by the device 10 will be transmitted to these load carrying members.

Referring to FIG. 1, each closure member 18 and 20 includes a pair of laterally spaced side elements 58 and 60 fixedly connected together at their outboard ends by a rear or transverse element 62. The side elements 58 and 60 define a space 64 therebetween sufficiently wide to receive and embrace the lower end of each respective leg member 14 and 16. Each closure member is slidably mounted between a pair of stepped side channels or guide flanges 66 and 68 as can be seen more clearly in FIG. 3, which guide flanges are fixedly mounted on the fore and aft faces of the respective leg members 14 and 16. Each closure member is retained about the lower free end of its respective leg member by slidingly engaging and abutting the guide flange or foot element 70, which flange 70 is fixed to and projects outwardly from the sides of the lower free end of each leg member. One or both of the side channels such as the side channel 68 may further include a downwardly projecting shoulder 71 which cooperates with and engages a corresponding stop element located on at least one of the closure member side elements such as the stop element 72 fixed to and projecting upwardly from the side element 58 adjacent the inboard end thereof as shown in FIGS. 1–4. This prevents disengagement of the closure members from their respective guide means when the closure members are moved to their fully opened position. In this regard, it is important that the free ends of the closure members clear the inner surface of the respective leg members when the closure members are moved to their respective open positions to provide full open access to the device. This allows substantially the entire space between the leg members to be utilized to admit a conduit member thereby facilitating the positioning and locking of a conduit member therein.

It is also important that the closure members 18 and 20 be angularly arranged so that they are normally biased toward their respective closed positions by gravity to further facilitate locking a conduit member within the present device. To achieve this end, the stepped side channels 66 and 68 and the closure members 18 and 20 slidably mounted therein are angularly oriented with respect to the longitudinal axis of each respective leg member in an upwardly and outwardly direction as shown in FIGS. 2 and 4 so that when the leg members are in a vertical position, gravity will urge each closure member inwardly and downwardly toward its respective closed position thereby restricting access to and egress from the space defined between the leg members. It is also important that the transverse element 62 of each closure member be located adjacent one end portion thereof so as to engage the outer surfaces of the respective leg members when said closure members are in their fully closed positions thereby restricting further movement of the closure members and preventing their disengagement from the respective guide means. This also enables the closure members to provide adequate support for a conduit member when the conduit member rests upon the closed closure members. Downward and inward movement of the closure members toward the respective opposite leg member beyond a predetermined point is therefore prevented by the abutting engagement of the element 62 with the outer face of the respective leg members 14 and 16. Upward and outward movement of the closure members beyond a predetermined point is prevented by abutment of the stop element 72 with the projecting shoulder 71 on the stepped channel 68.

The mere exertion of a force on closure members 18 and 20, such as by pushing a conduit member thereagainst in a direction towards the space defined between the leg members 14 and 16 (FIG. 4), slidably moves the closure members to their respective open positions in opposition to the force of gravity and allows the users thereof to easily insert, but not withdraw, the conduit member into the device 10. Once the conduit member is positioned therewithin and moved far enough to clear the free ends of the closure members, the closure members, through the urging force of gravity, will again move to their normally closed positions. The conduit member can then be released to rest upon the closure members 18 and 20 as best shown in FIG. 2. In this position, the closure members are restricted from any further movement by the rear element 62 abutting the outer surface of the respective leg members 14 and 16 as aforesaid.

Removal of the conduit member from the device is accomplished by simply moving the conduit member to a position such that the closure members 18 and 20 can be slidably moved to their fully open positions and, while holding the closure members in their open positions, the conduit member can be easily and quickly removed by passing it between the opened closure members and through the space defined between the opposed leg members 14 and 16. To facilitate movement of the closure members from a closed position to an open position, such as to release a pipe being carried, a ring member 74 is pivotally connected to each outboard face of the rear element 62. The ring member 74 provides a convenient means for grasping and pulling the closure members 18 and 20 to slide the same from the closed position shown in FIG. 2 to the open position shown in FIG. 4. The ring member 74 is pivotable to a folded position so as not to interfere with folding of the handle assemblies to their respective storage positions. A force exerted on the ring members 74, such as by using one's thumbs, in a direction outwardly away from the space defined between the leg members 14 and 16, will slidably move the closure members to their fully open positions allowing full open access to the conduit member for easy removal from the device.

The ring members may likewise be attached in such a manner that they may be placed in a fixed position when the device 10 is in use such as by using a non-continuous ring member 76 and a pair of apertures 82 and 84 each positioned respectively on one of the opposed side elements 58 and 60 in an offset or non-aligned arrangement such that the opposite end portions 78 and 80 of the non-continuous ring member 76 may be attached respectively to said pair of apertures as shown in FIG. 5. This ring mounting arrangement produces a binding action on the opposite end portions of the ring member 76 sufficient to hold and retain each ring member in a fixed position when so positioned. This is important because it enables a user to position the ring member in an outwardly and/or upwardly extended position prior to the lifting and carrying of a conduit member for effecting quick release of the conduit member being carried when desired. This also enables a user to grasp and hold one of the handle assemblies with one hand and pull the ring member 76 with the other hand to effect the quick and safe release thereof.

FIG. 2 illustrates how a conduit A is held by the present device 10 in the space between the leg members 14 and 16 and, more particularly, how the lower periphery of the conduit A is supported on the upper surfaces of the closure members 18 and 20. To lift the conduit A, the handle members 22 and 24 are pivoted to their extended positions so that they may be gripped by one or more workers. One such device 10 may be utilized on each longitudinal end of a conduit member to be moved and, if necessary, because of the weight of the particular conduit member, one or more devices 10 may be positioned intermediate the length of such conduit.

FIG. 4 depicts a conduit A in an intermediate stage of being inserted into or removed from the present device 10. For insertion of the conduit A within the subject device, the device 10 is moved to a position vertically above the conduit with the leg members 14 and 16 straddling the conduit. As the carrying device 10 is lowered the inner faces of the closure members 18 and 20 come into contact with the upper periphery of the conduit A and are pushed upwardly and outwardly along their respective guide channels to their outboard open positions. When the device 10 is lowered to the point at which the closure members 18 and 20 are no longer held outwardly by the periphery of the conduit A, the closure members 18 and 20 then slide downwardly and inwardly to their closed position under the influence of gravity and assume a position beneath the conduit member to support the lower periphery thereof. In some instances, it will be necessary for the user to elevate the device 10 and the conduit A to be embraced thereby to permit the closure members to slide to a position beneath the conduit member. To release the conduit A, the closure members 18 and 20 are slidably moved to their outboard or open positions as shown in FIG. 4 such as by pulling on the ring members 74 or 76 attached thereto as previously explained.

To facilitate use of the device 10 with a conventional power hoist, the support frame member 12 is provided with an aperture 86 through which a load line hook or similar connecting means may be attached to grip the frame member 12 during movement. If the present invention is being used with a power hoist, the handle assemblies 22 and 24 may be used in their extended position to aid in maneuvering the conduit during such movement or the handle assemblies may be folded to their out-of-the-way storage position. The present device 10 may also include means for restricting the movement of the conduit member once it is supported within the subject assembly. For example, each of the inwardly facing end portions of the closure members 18 and 20 may include a serrated upper edge 21 (FIG. 1). Engagement of a conduit member with the serrated edge portion would aid in restricting fore and aft movement as well as rotational movement of the conduit member within the device 10.

The present conduit carrying device thus facilitates the grasping and carrying of one or more pipes or conduits of different sizes and permits employment of as many devices and workers as are necessary for the physical requirements of the job at hand. The lifting and carrying of such conduits is made more convenient because each worker can get a firm hand-hold on his carrier handle, as opposed to trying to grasp a conduit about its periphery. Furthermore, because the handle assemblies are positioned directly in front of a worker's body, it may be lifted directly upwardly and carried in front of the worker rather than by a less convenient side-saddle lifting and carrying effort as might be occasioned if a worker grasped a conduit about its periphery.

Although it is recognized that various acceptable materials of construction are available and could equally be employed to construct the present device, it is preferred that the device 10 be cast from steel or other durable materials such as certain relatively strong plastic materials and certain other metal alloys which are able to withstand moderate impact and mishandling without breakage. It is also recognized that the various embodiments of the present device may be dimensioned and constructed so as to conform to and accommodate conduit members of varying sizes. In addition, it is also highly preferred that all of the corners and exposed edges of the present device be rounded or otherwise curved for safety reasons so that they will be smooth against the hands of a user and not rub or cause injury.

Thus there has been shown and described a conduit carrying device that fulfills all the objects and advantages sought therefor. Many changes, modifications, variations, and other uses and applications of the present construction will, however, become apparent to those skilled in the art after considering this specification and the accompany drawings. All such changes, modifications, variations, and other uses and applications which do not depart from the spirit and scope of the invention are deemed to be covered by the invention which is limited only by the claims which follow.

What is claimed is:

1. A conduit carrying device for grasping and carrying elongated elements, said device comprising a frame member having laterally spaced first and second leg members defining a space therebetween, each of said leg members having a longitudinal axis, means defining a channel associated with at least one of said leg members, said channel means having a longitudinal axis located such that said axis is angularly related with respect to the longitudinal axis of its associated leg member, a closure member slidably positioned within said channel means, said closure member being slidably movable between a first open position to admit an element to be carried to the space defined by said leg members and a second closed position to restrict egress of an element from said space, said closure member being normally urged towards its second closed position and being movable to its first open position in response to an upward force exerted thereagainst and gripping means associated with said frame member to facilitate gripping and carrying said device with such element positioned within the space defined between said leg members.

2. The device of claim 1 wherein a portion of said closure member in said second position is beneath the lower periphery of the element to be carried.

3. The device of claim 2 wherein said portion of said closure member positioned beneath the lower periphery of the element to be carried includes a serrated portion to restrict movement of said element within said device when positioned thereagainst.

4. The device of claim 1 including stop means associated with said closure member to limit movement thereof toward said first and second positions.

5. The device of claim 1 wherein said gripping means includes a pair of handle members pivotally associated with said frame member, each of said handle members being movable from a first position laterally projecting from said frame member to a second position extending adjacent to one of said leg members.

6. The device of claim 1 wherein said closure member includes a ring member attached to one end thereof to facilitate movement of said closure member from said second closed position to said first open position.

7. The device of claim 1 wherein said frame member is substantially U-shaped in configuration and includes a cross member, said leg members extending in substantially parallel relationship from the opposite sides of said cross member.

8. The device of claim 1 wherein said frame member includes means for attaching a power lifting device thereto.

9. A grasping and carrying device for pipes and the like, said device comprising a frame member having first and second laterally spaced leg members extending therefrom defining a space therebetween, said leg members each having a longitudinal axis, each of said leg members having upper and lower end portions associated therewith, a cross portion extending between the respective upper end portions of said first and second leg members, first and second channel means located adjacent the respective lower end portions of said first and second leg members, first and second closure members slidably positioned within said respective first and second channel means. said first and second closure members each including a pair of spaced apart side elements connected together at one end thereof by a transverse element extending therebetween, said spaced apart side elements defining a space therebetween sufficiently wide to receive and embrace one of said leg members, each of said closure members being slidable mounted about one of said leg members within the respective channel means, said closure members being normally urged by gravity toward their respective closed positions when said leg members are oriented in a substantially vertical position, said first and second closure members being slidably movable between an open position wherein said closure members are substantially withdrawn feom the space defined by and between said first and second leg members and a closed position wherein said closure members are positioned inwardly and downwardly relative to said open position to restrict egress from said space. first and second elongated handle members laterally projecting on opposite sides of said frame member, pivot means associated with each of said handle members for pivotally connecting said handle members to said frame member, each of said first and second handle members being pivotally movable between and extended carrying position wherein said handle members are substantially in-line with respect to one another and a folded storage position wherein said handle members are substantially adjacent to their respective leg members, whereby a pipe may be confined within the space between said first and second leg members by said first and second closure members and may be manually carried by gripping and carrying said first and second handle members on opposite sides of said pipe.

10. The device of claim 9 wherein said channel means includes upper and lower guide flanges affixed to the lower end portion of each of said first and second leg members, said guide flanges projecting upwardly and outwardly relative to the longitudinal axis of each of said leg members, each of said guide flanges slidably receiving one of said closure members such that said closure members extend respectively from said leg members and project inwardly and downwardly therefrom towards said opposite leg member.

11. The device of claim 10 including stop means on at least one of the side elements of each of said first and second closure members, said stop means cooperating with corresponding shoulder means on said guide flanges for limiting the slidable movement of said closure members beyond a predetermined outward position when said closure members are moved to their open positions.

12. device of claim 9 wherein said first and second elongated handle members each include a bracket affixed to one end portion thereof, first and second ear portions extending respectively from opposite lateral sides of said frame cross portion, said pivot means including a pivot pin member pivotably attaching each of said handle brackets to said respective ear portions for pivotal rotation of said handle members between their respective storage and carrying positions, and stop means associated with each of said handle brackets for restricting the upward pivotal movement of said handle members beyond their substantially in-line carrying positions.

13. The device of claim 9 wherein said frame cross portion includes an aperture extending through the center thereof for receiving and connecting a power lifting device thereto.

14. The device of claim 9 wherein said first and second closure members each includes a ring member associated with one end portion thereof for facilitating the movement of said closure members from their closed positions to their open positions.

15. The device of claim 14 said ring member comprises a non-continuous member having opposite free end portions, a pair of apertures each positioned extending respectively through one of said closure member side elements, said apertures being located in an offset arrangement relative to each other, and each of said opposite end portions of said non-continuous member being respectively engageable with one of said offset apertures.

16. A method of manually lifting and carrying an elongated conduit member or the like by utilizing at least two conduit carrying devices, each conduit carrying device including a substantially U-shaped frame member having laterally spaced leg members extending therefrom adapted to laterally straddle the conduit member to be carried in the space defined between said leg members, a pair of laterally projecting handle members extending respectively from the opposite sides of said frame member, each handle member adapted to be grasped by an individual user, said device further including closure members slidably mounted on the lower end portion of each of said leg members, each of said closure members being slidably movable between an open position wherein said closure members are substantially withdrawn from said space to open said space for admitting a conduit member therewithin and a closed position wherein said closure members restrict access to said space, said method comprising:
  (a) providing said conduit carrying devices wherein each of said closure members includes a pair of spaced apart side elements connected together at one end thereof by a transverse element extending therebetween, said spaced apart side elements defining a space therebetween sufficiently wide to receive and embrace one of said leg members,
  (b) manually positioning one of said conduit carrying devices adjacent each longitudinal end of the conduit member to be carried such that the leg members of each of said devices straddle said conduit member,
  (c) manually lowering both of said devices such that the lower end portions of said closure members contact the upper periphery of said conduit member and said closure members are moved thereby to their respective open positions,
  (d) continuing to manually lower said devices until said closure members clear the lower periphery of the conduit member being inserted therebetween causing said closure members to slide by gravity to their respective closed positions to support the lower periphery of said conduit member,
  (e) simultaneously manually lifting all of the handle members associated with said devices with the conduit member retained in the space between the respective leg members of said devices,
  (f) carrying the conduit member to the desired location, and
  (g) subsequently manually sliding each of said closure members to their respective open positions to release the conduit member being carried by said devices.

17. A grasping and carrying device for pipes and the like, said device comprising a frame member having first and second laterally spaced leg members extending therefrom defining a space therebetween, said leg members each having a longitudinal axis, each of said leg members having upper and lower end portions associated therewith, a cross portion extending between the respective upper end portions of said first and second leg members, first and second channel means each including upper and lower guide flanges affixed to the respective lower end portions of said first and second leg members, said guide flanges projecting upwardly and outwardly relative to the longitudinal axis of the respective leg members, first and second closure members each including a pair of spaced apart side elements connected together at one end thereof by a transverse element extending therebetween, said spaced apart side elements defining a space therebetween sufficiently wide to receive and embrace one of said leg members, each of said closure members being slidably mounted about one of said leg members within said upper and lower guide flangs such that each of said closure members projects inwardly and downwardly from said one leg member towards said opposite leg member, said first and second closure members being slidably movable between an open position wherein said closure members are substantially withdrawn from the space defined by and between said first and second leg members and a closed position wherein said closure members are positioned inwardly and downwardly relative to said open position to restrict egress from said space, said closure members being normally urged by gravity toward their respective closed positions when said leg members are oriented in a substantially vertical position, first and second elongated handle members laterally projecting on opposite sides of said frame member, pivot means associated with each of said handle members for pivotally connecting said handle members to said frame member, each of said first and second handle members being pivotally movable between an extended carrying position wherein said handle members are substantially in-line with respect to one another and a folded storage position wherein said handle members are substantially adjacent to their respective leg members, whereby a pipe may be confined within the space between said first and second leg members by said first and second closure members and may be manually carried by gripping and carrying said first and second handle members on opposite sides of said pipe.

18. The device of claim 17 including stop means on at least one of the side elements of each of said first and second closure members, said stop means cooperating with corresponding shoulder means on said guide flanges for limiting the slidable movement of said closure members beyond a predetermined outward position whin said closure members are moved to their open positions.

19. The device of claim 17 wherein said first and second elongated handle members each include a bracket affixed to one end portion, thereof, first and second ear portions extending respectively from opposite lateral sides of said frame cross portion, said pivot means including a pivot pin member pivotally attaching each of said handle brackets to said respective ear portions for pivotal rotation of said handle members between their respective storage and carrying positions, and stop means associated with each of said handle brackets for restricting the upward pivotal movement of said handle members beyond their substantially in-line carrying positions.

20. The device of claim 17 wherein said frame cross portion includes an aperture extending through the center thereof for receiving and connecting a power lifting device thereto.

21. The device of claim 17 wherein said first and second closure members each include a ring member associated with one end portion thereof for facilitating the movement of said closure members from their closed positions to their open positions.

22. The device of claim 21 wherein said ring member comprises a non-continuous member having opposite free end portions, a pair of apertures each positioned extending respectively through one of said closure member side elements, said apertures being located in an offset arrangement relative to each other, and each of said opposite end portions of said non-continuous member being respectively engageable with one of said offset apertures.

* * * * *

UNITED STATES PATENT OFFICE
CERTIFICATE OF CORRECTION

Patent No. 4,632,442           Dated December 30, 1986

Inventor(s) Thomas W. Gerding

It is certified that error appears in the above-identified patent and that said Letters Patent are hereby corrected as shown below:

Column 1, line 47 "tp" should be --to--.

Column 10, line 27 "." should be --,--.

Column 10, line 45 "." should be --,--.

Column 11, line 11 "The" should be inserted before "device".

Column 11, line 34 "wherein" should be inserted before "said".

Signed and Sealed this

Seventeenth Day of March, 1987

Attest:

DONALD J. QUIGG

*Attesting Officer*      *Commissioner of Patents and Trademarks*